United States Patent
Paithane et al.

(10) Patent No.: US 9,438,613 B1
(45) Date of Patent: Sep. 6, 2016

(54) DYNAMIC CONTENT ACTIVATION FOR AUTOMATED ANALYSIS OF EMBEDDED OBJECTS

(71) Applicant: FireEye, Inc., Milpitas, CA (US)

(72) Inventors: Sushant Paithane, Sunnyvale, CA (US); Sai Vashisht, Union City, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 14/673,535

(22) Filed: Mar. 30, 2015

(51) Int. Cl.
G06F 12/14 (2006.01)
H04L 29/06 (2006.01)
G06F 17/30 (2006.01)

(52) U.S. Cl.
CPC ..... *H04L 63/1425* (2013.01); *G06F 17/30864* (2013.01)

(58) Field of Classification Search
USPC ................ 726/23; 718/1; 713/189
See application file for complete search history.

(56) References Cited

U.S. PATENT DOCUMENTS

| | | | |
|---|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |
| 6,442,696 B1 | 8/2002 | Wray et al. |
| 6,484,315 B1 | 11/2002 | Ziese |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Network Security: NetDetector—Network Intrusion Forensic System (NIFS) Whitepaper", ("NetDetector Whitepaper"), (2003).

(Continued)

*Primary Examiner* — Amare F Tabor
(74) *Attorney, Agent, or Firm* — Rutan & Tucker LLP

(57) ABSTRACT

According to one embodiment, a threat detection platform is integrated with at least one virtual machine that automatically performs a dynamic analysis of a received document object and monitors the processing during the dynamic analysis. The dynamic analysis includes a detection of embedded objects and may automatically process the embedded objects, while maintaining a context of the embedding, within the virtual machine processing the document object. The virtual machine may monitor the processing of both the document object and the embedded object. The results of the processing may be analyzed to determine whether the document object includes malware and/or a threat level of the document object.

73 Claims, 7 Drawing Sheets

(56) References Cited

U.S. PATENT DOCUMENTS

| | | | |
|---|---|---|---|
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B2 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,072 B2 | 6/2012 | Matulic |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,198 B2 | 10/2012 | Mott et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,240 B2 | 11/2012 | Lorsch |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,397,306 B1 * | 3/2013 | Tormasov ............... G06F 21/00 713/164 |
| 8,402,529 B1 | 3/2013 | Green et al. |
| 8,438,174 B2 * | 5/2013 | Shields ............ G06F 17/30781 707/755 |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,533,844 B2 * | 9/2013 | Mahaffey ............ G06F 21/564 709/203 |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |

(56) References Cited

U.S. PATENT DOCUMENTS

| | | |
|---|---|---|
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,931,109 B2 * | 1/2015 | Adams ............... G06F 21/6218 726/26 |
| 8,935,779 B2 | 1/2015 | Manni et al. |
| 8,959,428 B2 | 2/2015 | Majidian |
| 8,973,135 B2 * | 3/2015 | Thomas ................ G06F 21/00 726/23 |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 * | 3/2015 | Staniford ............ H01L 63/1416 726/22 |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent |
| 9,262,635 B2 | 2/2016 | Paithane et al. |
| 9,282,109 B1 | 3/2016 | Aziz et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0229044 A1 | 10/2005 | Ball |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0190561 A1 | 8/2006 | Conboy et al. |
| 2006/0191010 A1 | 8/2006 | Benjamin |

(56) References Cited

U.S. PATENT DOCUMENTS

| | | |
|---|---|---|
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320556 A1 | 12/2008 | Lee et al. |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192057 A1 | 7/2010 | Majidian |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0275210 A1 | 10/2010 | Phillips et al. |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1* | 2/2011 | Mahaffey ............... G06F 21/564 726/23 |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |

(56) References Cited

U.S. PATENT DOCUMENTS

| | | |
|---|---|---|
| 2011/0173178 A1 | 7/2011 | Conboy et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260340 A1* | 10/2012 | Morris ............... G06F 21/56 726/23 |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086683 A1* | 4/2013 | Thomas ............... G06F 21/00 726/24 |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117849 A1* | 5/2013 | Golshan ............... G06F 21/53 726/23 |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0223566 A1* | 8/2014 | Zaitsev ............... G06F 21/567 726/24 |
| 2014/0237600 A1 | 8/2014 | Silberman et al. |
| 2014/0259166 A1* | 9/2014 | Ghaskadvi ......... G06Q 30/0273 726/23 |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0325344 A1 | 10/2014 | Bourke et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0220735 A1 | 8/2015 | Paithane et al. |
| 2015/0294113 A1* | 10/2015 | Troeger ............... G06F 21/53 726/25 |
| 2015/0372980 A1 | 12/2015 | Eyada |
| 2016/0044000 A1 | 2/2016 | Cunningham |
| 2016/0127393 A1 | 5/2016 | Aziz et al. |

FOREIGN PATENT DOCUMENTS

| | | |
|---|---|---|
| WO | 0206928 | 1/2002 |
| WO | 0223805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

"Packet", Microsoft Computer Dictionary Microsoft Press, (Mar. 2002), 1 page.

"When Virtual is Better Than Real", IEEEXplore Digital Library, available at, http://ieeexplore.ieee.org/xpl/articleDetails.jso?reload=true&arnumber=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye") (Sep. 2003).

Adobe Systems Incorporated, "PDF 32000-1:2008, Document management—Portable document format—Part1:PDF 1.7", First Edition, Jul. 1, 2008, 756 pages.

AltaVista Advanced Search Results. "attack vector identifier" Http://www.altavista.com/web/results?Itag=ody&pg=aq&aqmode=aqa=Event+Orchestrator . . . , (Accessed on Sep. 15, 2009).

AltaVista Advanced Search Results. "Event Orchestrator". Http://www.altavista.com/web/results?Itag=ody&pg=aq&aqmode=aqa=Event+Orchesrator . . . , (Accessed on Sep. 3, 2009).

(56) References Cited

OTHER PUBLICATIONS

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Aziz, Ashar, System and Method for Malware Containment, U.S. Appl. No. 14/620,060, filed Feb. 11, 2015, non-Final Office Action dated Apr. 3, 2015.
Baecher, "The Nepenthes Platform: An Efficient Approach to collect Malware", Springer-verlaq Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Cisco "Intrusion Prevention for the Cisco ASA 5500-x Series" Data Sheet (2012).
Cisco, Configuring the Catalyst Switched Port Analyzer (SPAN) ("Cisco"), (1992-2003).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I., "PyFlag—An advanced network forensic framework", Digital investigation 5, ELSEVIER, (2008), pp. S112-S120.
Costa, M., et al., "Vigilante: End-to-End Containment of Internet Worms", SOSP '05 Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).
Deutsch, P., ""Zlib compressed data format specification version 3.3" RFC 1950, (1996)".
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Srpinger Berlin Heidelberg, 2012.
Goel, et al., Reconstructing System State for Intrusion Analysis, Apr. 2008 SIGOPS Operating Systems Review vol. 42 Issue 3, pp. 21-28.
Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek-.com/microsofts-honeymonkeys-show-patching-wi/167600716 [retrieved on Sep. 29, 2014].
Heng Yin et al, Panorama: Capturing System-Wide Information Flow for Malware Detection and Analysis, Research Showcase @ CMU, Carnegie Mellon University, 2007.
Hjelmvik, Erik, "Passive Network Security Analysis with NetworkMiner", (IN)SECURE, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc&ResultC . . . (Accessed on Aug. 28, 2009).
Isohara, Takamasa, Keisuke Takemori, and Ayumu Kubota. "Kernel-based behavior analysis for android malware detection," Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T. et al., "Operating System Support for Virtual Machines", ("King").
Krasnyansky, Max, et al., Universal TUN/TAP driver, available at https://www.kernel.org/doc/Documentation/networking/tuntap.txt (2002) ("Krasnyansky").
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., a VMM-Based System Call Interposition Framework for Program Monitoring, Dec. 2010, IEEE 16th International Conference on Parallel and Distributed Systems, pp. 706-711.
Liljenstam, Michael, et al., "Simulating Realistic Network Traffic for Worm Warning System Design and Testing", Institute for Security Technology studies, Dartmouth College, ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Bowen, B. M. et al "BotSwindler: Tamper Resistant Injection of Believable Decoys in VM-Based Hosts for Crimeware; Detection", in Recent Advances in Intrusion Detection, Springer ISBN: 978-3-642-15511-6 (pp. 118-137) (Sep. 15, 2010).
PCT/US2015/067082 filed Dec. 21, 2015 International Search Report and Written Opinion dated Feb. 24, 2016.
U.S. Appl. No. 13/775,171, filed Feb. 23, 2013 Final Office Action dated Dec. 12, 2014.
U.S. Appl. No. 13/775,171, filed Feb. 23, 2013 Non-Final Office Action dated Aug. 5, 2015.
U.S. Appl. No. 13/775,171, filed Feb. 23, 2013 Non-Final Office Action dated Mar. 27, 2014.
Marchette, David J., Computer Intrusion Detection and Network Monitoring: A Statistical ("Marchette"), (2001).
Margolis, P.E., "Random House Webster's Computer & Internet Dictionary 3rd Edition", ISBN 0375703519, (Dec. 1998).
Moore, D., et al., "Internet Quarantine: Requirements for Containing Self-Propagating Code", INFOCOM, vol. 3, (Mar. 30-Apr. 3, 2003), pp. 1901-1910.

(56) References Cited

OTHER PUBLICATIONS

Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J., et al., "Polygraph: Automatically Generating Signatures for Polymorphic Worms", In Proceedings of the IEEE Symposium on Security and Privacy, (May 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Peter M. Chen, and Brian D. Noble, "When Virtual Is Better Than Real, Department of Electrical Engineering and Computer Science", University of Michigan ("Chen").
Reiner Sailer, Enriquillo Valdez, Trent Jaeger, Roonald Perez, Leendert van Doorn, John Linwood Griffin, Stefan Berger., sHype: Secure Hypervisor Approach to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/~casado/pcap/sectionl.html, (Jan. 6, 2014).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Appl. No. 11/717,475, filed Mar. 12, 2007 Final Office Action dated Feb. 27, 2013.
U.S. Appl. No. 11/717,475, filed Mar. 12, 2007 Final Office Action dated Nov. 22, 2010.
U.S. Appl. No. 11/717,475, filed Mar. 12, 2007 Non-Final Office Action dated Aug. 28, 2012.
U.S. Appl. No. 11/717,475, filed Mar. 12, 2007 Non-Final Office Action dated May 6, 2010.
U.S. Appl. No. 14/059,381, filed Oct. 21, 2013 Non-Final Office Action dated Oct. 29, 2014.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Mathew M., "Throttling Virses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

DYNAMIC CONTENT ACTIVATION FOR AUTOMATED ANALYSIS OF EMBEDDED OBJECTS

FIELD

Embodiments of the disclosure relate to the field of cyber security. More specifically, embodiments of the disclosure relate to a system for detecting anomalous, or more specifically, malicious behavior by detecting and launching embedded objects within a virtual machine.

GENERAL BACKGROUND

Over the last decade, malicious software has become a pervasive problem for Internet users as many networked resources include vulnerabilities that are subject to attack. For instance, over the past few years, more and more vulnerabilities are being discovered in software that is loaded onto endpoint devices present on the network. These vulnerabilities may be exploited by allowing a third-party, e.g., through computer software, to gain access to one or more areas within the network not typically accessible. For example, a third-party may exploit a software vulnerability to gain unauthorized access to email accounts and/or data files.

While some software vulnerabilities continue to be addressed through software patches, prior to the release of such software patches, network devices will continue to be targeted for attack through software vulnerabilities and/or by exploits, namely malicious computer code that attempts to acquire sensitive information, adversely influence, or attack normal operations of the network device or the entire enterprise network by taking advantage of a vulnerability in computer software.

In particular, malware is often placed in objects embedded in network traffic. For example, a portable document file (PDF) document (document object) may be received as part of network traffic and include a second PDF document embedded therein. Current malware detection systems have difficulty detecting the embedded object, especially if the embedded object is not present on the default view (e.g., the first page of a PDF document) of the document object during the malware detection process. For example, current malware detection systems may have difficulty detecting an embedded object that is located on page 50 of an 80 page PDF document, due to, in part, time constraints in analyzing the object.

Additionally, even if current malware detection systems are able to detect an embedded object within a document object, the presence of the embedded object is merely used as one characteristic of the document object. Current malware detection systems typically do not process the embedded object to determine whether the embedded object is itself malicious.

Therefore, current malware detection systems may provide false negatives and/or false positives because a full understanding of the maliciousness of the embedded object is not obtained. Numerous false negatives are reported when the document object is non-malicious, one of the embedded objects is malicious but the mere presence of the embedded object is not sufficient to cause the malware detection system to determine the document object is malicious. Since current malware detection systems do not process the embedded object, the maliciousness goes undetected. Similarly, numerous false positives are reported when the document object and the embedded object are both non-malicious but the mere presence of the embedded object causes the malware detection system to determine the document object is malicious.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
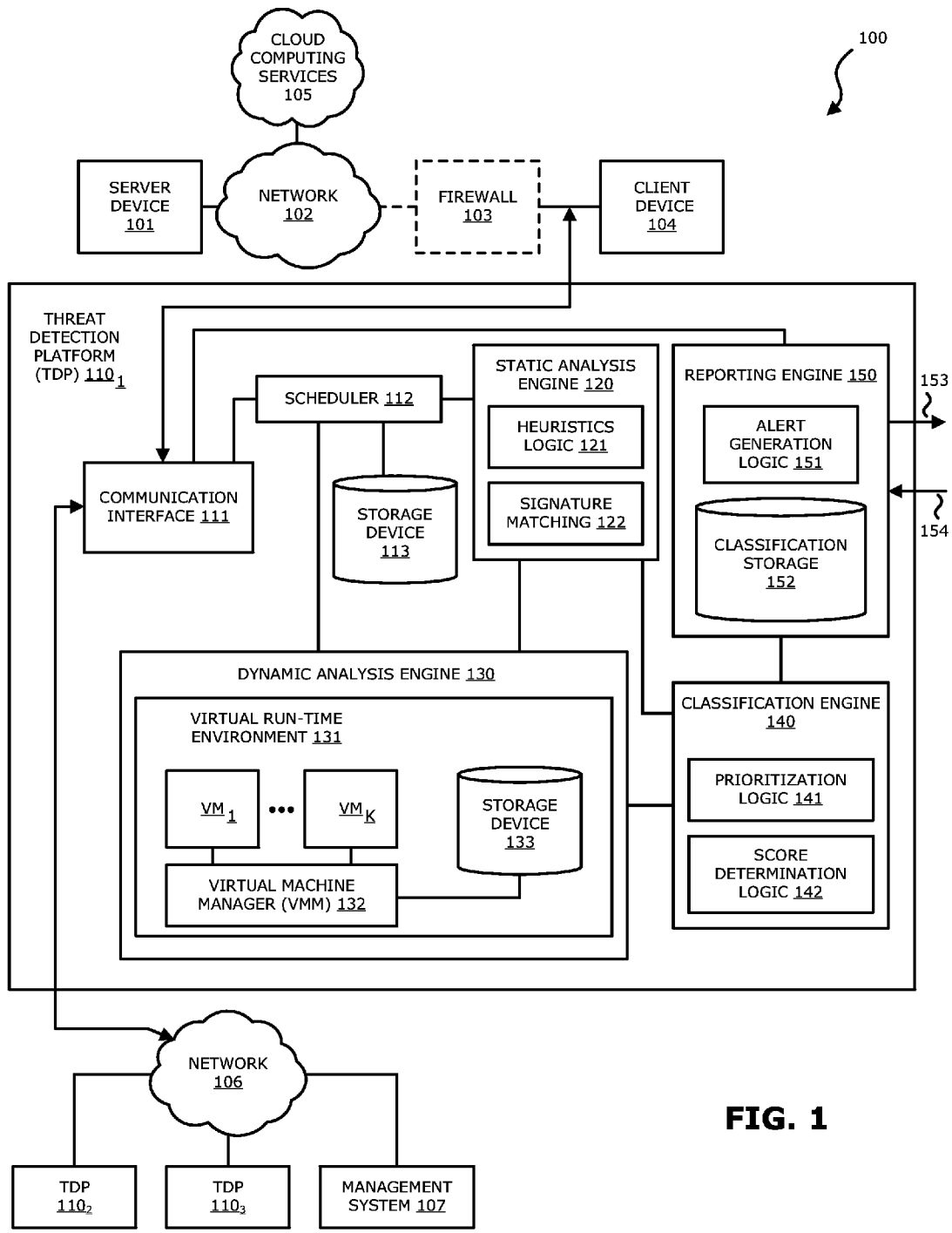
FIG. 1 is an exemplary block diagram of a network deploying a plurality of threat detection platforms (TDPs) deploying the invention.

Various embodiments of the disclosure relate to a threat detection platform (TDP) that improves malware detection, particularly, in the case of malware including embedded objects (wherein "malware" may collectively refer to exploits and/or malicious code). In one embodiment of the disclosure, the TDP determines whether an object is embedded within a document object through a dynamic analysis of the document object, and the embedded object, within a virtual run-time environment. Herein, the virtual run-time environment features one or more virtual machine instances (VMs), which may be provisioned with a guest image associated with a prescribed software profile. Each guest image may include a software application and/or an operating system (OS). Each guest image may further include one or more monitors, namely software components that are configured to observe and capture run-time behavior of an object under analysis during processing within the virtual machine. In another embodiment, the TDP may also perform a static analysis of the document object and/or embedded object (e.g., rules-based analysis using heuristics and/or comparisons of one or more signatures).

Herein, each VM may be configured with a guest image to simulate a particular endpoint device. Specifically, each VM may be configured with different operating systems, different applications, different versions of a common operating system and/or different versions of a common application. Herein, each VM may include a Dynamic Content Analyzer that includes a launcher, an identification agent and an activation agent. When a document object is received by a VM for dynamic analysis, the launcher launches the document object in a first application based on the object-type of the document object. The launcher may launch the document object in several versions of the first application within the VM. When malware in a document object is not detected within a predetermined amount of time of processing, the Dynamic Content Analyzer selects a version of the first application and determines whether an object is embedded therein by employing an automation framework interface to query the document object model of the document object. The employment of the automation framework interface of the application will be discussed in detail below. Depending on the object-type of a detected embedded object, the Dynamic Content Analyzer may evoke the automation framework interface of the application to activate the embedded object (e.g., launch the embedded object) in the VM. The embedded object is then processed in the VM. The level of maliciousness of the embedded object may then be attributed to the document object when determining whether the document object is malicious.

I. TERMINOLOGY

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

An "exploit" may be construed broadly as information (e.g., executable code, data, command(s), etc.) that attempts to take advantage of a software vulnerability and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context.

The term "object" generally refers to a collection of data, whether in transit (e.g., over a network) or at rest (e.g., stored), often having a logical structure or organization that enables it to be classified for purposes of analysis. An "object" may be referred to as having a known-formatted structure that may be set-forth in specifications promulgated by, for example, one or more corporate entities and/or standardization organizations. Examples of known-formatted structures include, but are not limited or restricted to, the structures set forth by Microsoft® Office applications such as Word, Excel, PowerPoint, etc., the structure of a PDF, the structure of a Hypertext Markup Language (HTML) file, the structure of an Extensible Markup Language (XML) files, the structure of Microsoft® Compiled HTML Help (CHM) files, the structure of Rich Text Format (RTF) files, the structure of Hanword files (Korean word processing file), etc.

During analysis, for example, the object may exhibit a set of expected characteristics and, during processing, a set of expected behaviors. The object may also include an embedded object, which may in turn provide evidence that the object should be classified as malicious.

The term "document object" should be interpreted as an object that is not natively executable and that potentially includes an embedded object. For example, an object may be received in network traffic and provided to a threat detection platform for static and/or dynamic analysis such that a determination as to whether the object is malicious may be made. The object received in network traffic and provided to the threat detection platform may be referred to as a "document object." Further, static and/or dynamic analysis may detect that an object is embedded within the document object. Hereinafter, the object embedded in the document object will be referred to as an "embedded object." Furthermore, for purposes of the invention, a Uniform Resource Locator (URL) should be interpreted as an embedded object. In another embodiment, the document object may be included in content stored in persistent storage, such as portable flash drives and/or hard disk drives accessed via a communication interface.

The term "network device" should be construed as any electronic device with the capability of connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, a computer, etc.

A "platform" generally refers to an electronic device which network connectivity that typically includes a housing that protects, and sometimes encases, circuitry with data processing and/or data storage. Examples of a platform may include a server or an endpoint device that may include, but is not limited or restricted to a stationary or portable computer including a desktop computer, laptop, electronic reader, netbook or tablet; a smart phone; a video-game console; or wearable technology (e.g., watch phone, etc.).

The terms "suspicious" and "malicious" may both represent a probability (or level of confidence) that the object is associated with a malicious attack. For instance, the probability may be based, at least in part, on (i) pattern matches; (ii) analyzed deviations in messaging practices set forth in applicable communication protocols (e.g., HTTP, TCP, etc.) and/or proprietary document specifications (e.g., Adobe PDF document specification); (iii) analyzed compliance with certain message formats established for the protocol (e.g., out-of-order commands); (iv) analyzed header or payload parameters to determine compliance, (v) attempts to communicate with external servers during dynamic processing, and/or (vi) attempts to access memory allocated to the application processing the document object.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for detecting malware, specifically malware including embedded objects. As this invention is susceptible to embodiments of many different forms, it is intended that the present disclosure is to be considered as an example of the principles of the invention and not intended to limit the invention to the specific embodiments shown and described.

II. GENERAL ARCHITECTURES OF THREAT DETECTION PLATFORM

Referring to FIG. 1, an exemplary block diagram of a network 100 deploying a plurality of threat detection platforms (TDPs) $110_1$-$110_N$ (N>1, where N=3 for this embodiment) communicatively coupled to a management system 107 via a network 106 is shown. In general, the management system 107 is adapted to manage each TDP $110_1$-$110_3$. For instance, the management system 107 may be configured to provide content updates (e.g., upload new rules/signatures or modified rules/signatures, delete rules/signatures, modify parameters that are utilized by the rules/signatures) to logic included within each of the TDP $110_1$-$110_3$.

As shown in FIG. 1, a first TDP $110_1$ is an electronic device that is adapted to analyze information associated with incoming data (e.g., network traffic, input data over a communication network 102, input data from another type of transmission medium, etc.) from/to one or more endpoint devices 130. In this illustrative embodiment, the communication network 102 may include a public network such as the Internet, a private network (e.g., a local area network "LAN", wireless LAN, etc.), or a combination thereof.

According to the embodiment of FIG. 1, the first TDP $110_1$ may be communicatively coupled with one or more endpoint devices 104 (hereinafter referred to as "endpoint device(s)"). As shown, the first TDP $110_1$ may be communicatively coupled with the network 102 via the communication interface 111, which directs signaling on the communication network 102 to the scheduler 112 which in turn directs signaling to the static analysis engine 120, the dynamic analysis engine 130 and/or the storage device 113. The communication interface 111 is configured to receive at least a portion of network traffic propagating to/from the endpoint device(s) 104 and provide information associated with the received portion of the network traffic to the first TDP $110_1$. This information may include metadata and may be a portion of the received network traffic or a duplicated copy of the portion of the received network traffic. The metadata may be used, at least in part, to determine protocols, application types and other information that may be subsequently used by logic, such as the scheduler 112 for example, to configure one or more $VM_1$-$VM_K$ (K≥1) with selected software profiles. For instance, the metadata may be used to determine which software images (e.g., application(s), if any, and/or operating systems to be fetched from the storage device 113 for configuring operability of the $VM_1$-$VM_K$.

Alternatively, although not shown, the communication interface 111 may be configured to receive files or other objects that are not provided over a network. For instance, as an example, the communication interface 111 may be a data capturing device that automatically (or on command), accessing data stored in a storage system or another type of interface, such as a port, for receiving objects manually provided via a suitable dedicated communication link or from storage media such as portable flash drives. Additionally, although not shown, the communication interface 111 may be integrated into an intermediary device in the communication path (e.g., a firewall, router, switch or other networked electronic device) or may be a standalone component, such as a commercially available network tap.

As further shown in FIG. 1, the first TDP $110_1$ comprises the communication interface 111, the static analysis engine 120, the dynamic analysis engine 130, the classification engine 140 and the reporting engine 150. Herein, the communication interface 111 receives an object from the network 102 and converts the object into a format, as needed or appropriate, on which analysis by the static analysis engine 120 may be conducted. This conversion may involve decompression of the object, decompilation of the object, extraction of specific data associated with the object, and/or emulation of the extracted data (like Javascript™).

The static analysis engine 120 may include one or more controllers (e.g., processing circuitry such as one or more processors) that feature, at least, heuristics logic 121 and signature matching logic 122. Further, the static analysis engine 120 may include one or more software modules that, when executed by the controller(s), analyzes characteristics associated with the object, which may be a portion of network traffic (or downloaded data) according to an embodiment of the disclosure. Such static analysis may include one or more checks being conducted on the object without its execution. Examples of the checks may include (i) heuristics, performed by the heuristic logic 121, which are based on rules or policies as applied to the object and may determine whether one or more portions of the object are associated with anomalous or suspicious characteristics associated with known malware (e.g., a particular URL associated with known malware, or a particular source or destination address etc.); and/or (ii) signature matching, performed by the signature matching logic 122, which may include determinative rule-based analysis such as comparisons with entries on a blacklist and/or a whitelist.

The static analysis engine 120 may route the object to the virtual run-time environment 131 within the dynamic analysis engine 130. The virtual run-time environment 131 may include a virtual machine monitor (VMM) 132, a storage device 133 and the $VM_1$-$VM_K$ (K≥1). The virtual run-time environment 131 provides for the processing of an object in one or more $VM_1$-$VM_K$ managed by the VMM 132.

The classification engine 140 may be configured to receive the static analysis results (e.g., results from a static analysis, metadata associated with the incoming network traffic, etc.) and/or the dynamic analysis results stored in the storage device 133. According to one embodiment of the disclosure, the classification engine 140 comprises the prioritization logic 141 and the score determination logic 142. The score determination logic 142 is configured to determine a probability (or level of confidence) that the document object is part of a malicious attack. More specifically, based on the dynamic analysis of the document object and a detected embedded object, the score determination logic 142 generates a value that may be used, in part, to identify the likelihood that the document object is part of a malicious attack.

The prioritization logic 141 may be configured to apply weighting to results provided from dynamic analysis engine 130 and/or static analysis engine 120. Thereafter, the classification engine 140 may route classification results comprising the weighting and/or prioritization applied to the static analysis results and dynamic analysis results to the reporting engine 150. The classification results may include the classification of any malware detected into a family of malware, describe the malware and further include the metadata associated with any object(s) within which the malware were detected.

As shown in FIG. 1, the reporting engine 150 includes an alert generation logic 151 and a classification storage 152. The reporting engine 150 is adapted to receive information from the classification engine 140 and generate alerts 153 that identify to a user of an endpoint device, network administrator or an expert network analyst that the object is associated with a malicious attack. The alerts may include various types of messages, which may include text messages and/or email messages, video or audio stream, or other types of information over a wired or wireless communication path. The reporting engine 150 features an optional user interface 154 (e.g., touch pad, keyed inputs, etc.) for customization as to the reporting configuration. In addition, the reporting engine 150 may store the classification results in the classification storage 153 for future reference.

Although FIG. 1 illustrates the TDP $110_1$ as a dedicated network device and the discussion of FIG. 1 explains examples based on an object received by the communication interface 111, the TDP $110_1$ may be implemented on an endpoint device. In such an embodiment, prior to actual execution of the object, the TDP $110_1$ may launch the object in a sandboxed environment and conduct simulated human interaction and simulated device controls. Responsive to non-anomalous behaviors by the object, the endpoint is allowed to utilize the object. In addition, the TDP $110_1$ may be implemented in the cloud computing services 105, where the below described simulated human and device control interactions may be fully or partially conducted therein.

Figure 2:
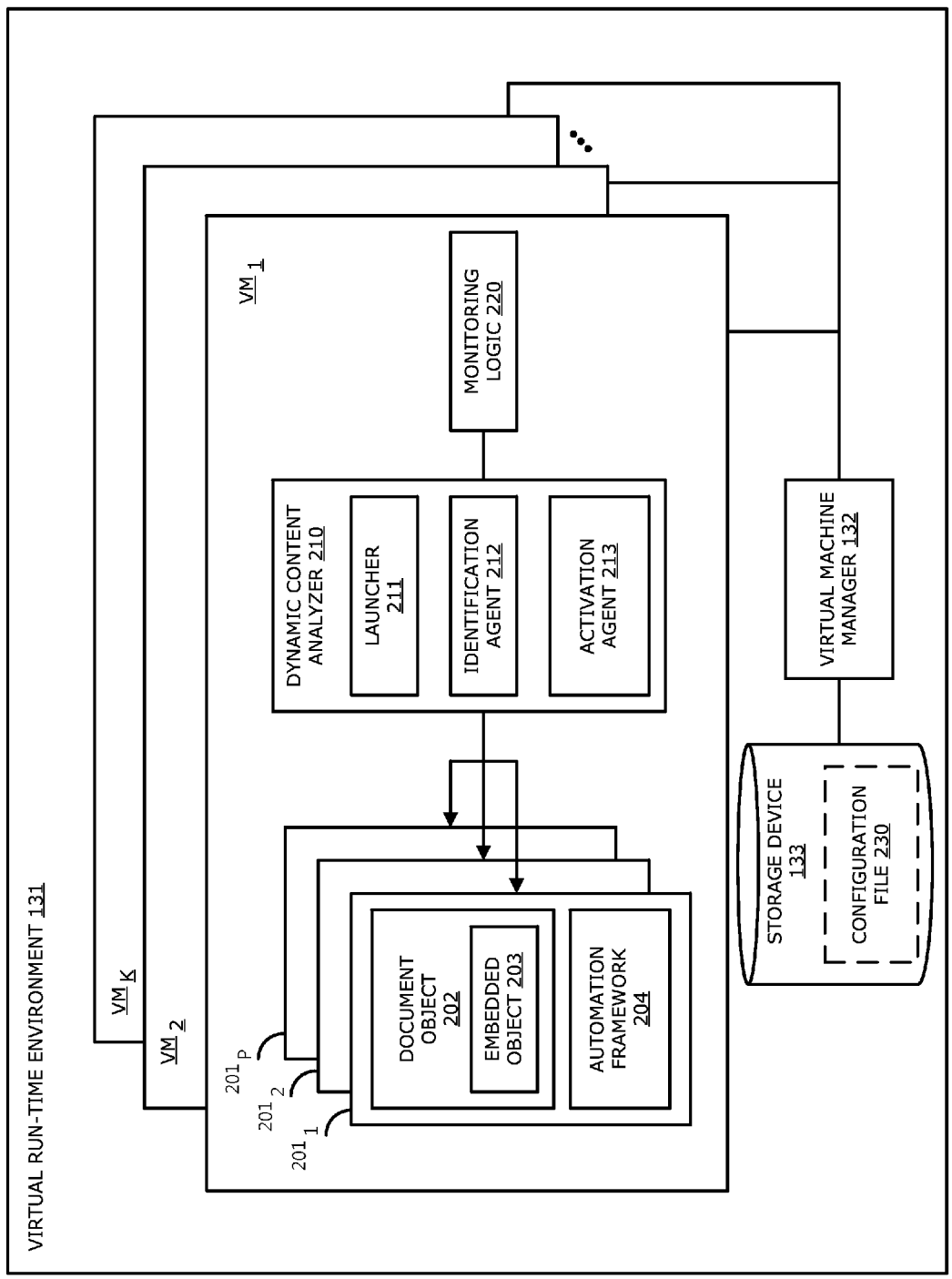
FIG. 2 is a block diagram of an exemplary dynamic analysis engine within the TDP $110_1$ of FIG. 1.

Referring now to FIG. 2, a block diagram of the virtual run-time environment 131 of the dynamic analysis engine 130 within the TDP $110_1$ of FIG. 1 is shown. The virtual run-time environment 131, as mentioned above, provides for the processing of an object through one or more of the $VM_1$-$VM_K$. As shown, the $VM_1$ may be provisioned with a monitoring logic 220 and a Dynamic Content Analyzer 210 that includes a launcher 211, an identification agent 212 and an activation agent 213. Additionally, the Dynamic Content Analyzer 210 may launch one or more applications $201_1$-$201p$ (where P≥1) when processing a document object 202, wherein each application includes an automation framework interface 204. Herein, the term "processing" may include launching an embedded object wherein launching should be interpreted as placing the embedded object in an activated state (e.g., opening an embedded object having an object-type of a Word® document using Microsoft® Word). As such, "processing" may include launching the embedded object and performing processing on the activated embedded object including, for example, scrolling through one or more pages, changing between one or more slides or sheets, adding text to the activated embedded object, or the like.

In one embodiment, an instance of the monitoring logic 220 is located within each of the one or more $VM_1$-$VM_K$. In particular, the monitoring logic 220 may monitor the launching process of the document object 202 within the $VM_1$, the processing of the document object 202, the launching process of one or more embedded objects 203 detected within the $VM_1$ and the processing of the one or more embedded objects 203. In one embodiment, the monitoring logic 220 may track the processing of each application (e.g., multiple versions of the application) by the process identification (PID) of the application.

As shown, the monitoring logic 220 is included within each of the $VM_1$-$VM_K$. In an alternative embodiment, the monitoring logic 220 may be located in the virtual run-time environment 131 wherein a single instance of the monitoring logic 220 may monitor the processing within each of the $VM_1$-$VM_K$.

The storage device 133 may store the processing results of each of the $VM_1$-$VM_K$. The results of each of the $VM_1$-$VM_K$ may include, at least, identifying information of the document object 202, details of the one or more versions of the application used to launch and process the document object 202, identifying information of a detected embedded object 203 and/or details of the launching and processing of the embedded object 203. Additionally, the storage device 133 may optionally store a configuration file 230. As will be discussed below, the configuration file 230 may include information setting forth, among other information, one or more versions of an application with which to process the document object 202, a version of the application processing the document object 202 to select when determining whether an embedded object 203 is present, a predetermined amount of processing time to process the document object 202 prior to determining whether an embedded object 203 is present, a priority ordering of object-types for activating embedded objects and/or a predefined list of embedded object-types that should be processed.

Figure 3:
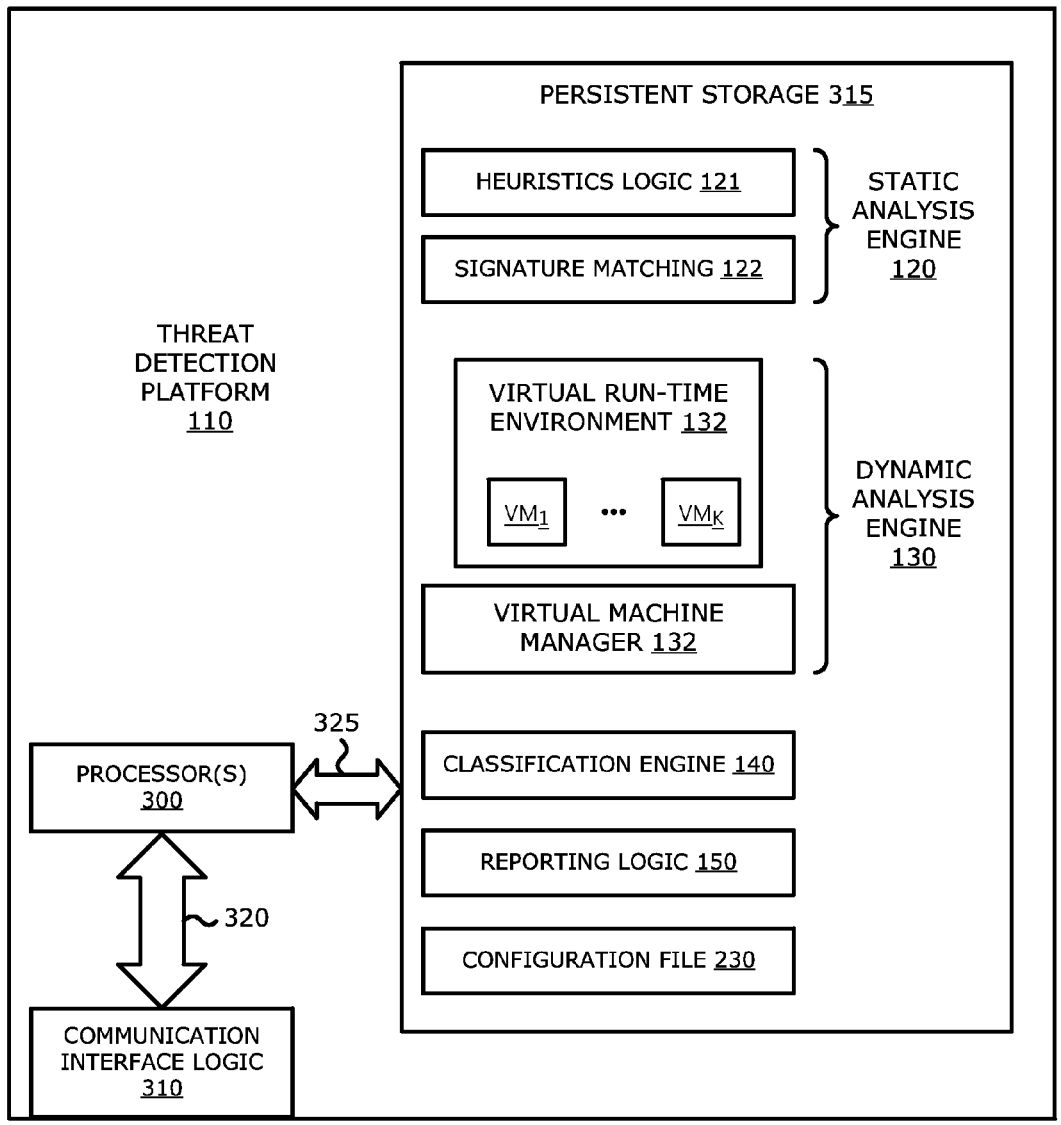
FIG. 3 is an exemplary block diagram of logic associated with the TDP $110_1$ of FIG. 1.

Referring to FIG. 3, an exemplary block diagram of logic associated with the TDP $110_1$ of FIG. 1 is shown. The TDP $110_1$ includes one or more processors 300 that are coupled to the communication interface logic 310 via a first transmission medium 320. Communication interface logic 310 enables communication with the TDPs $110_2$-$110_3$ and the management system of 107 of FIG. 1. According to one embodiment of the disclosure, the communication interface logic 310 may be implemented as a physical interface including one or more ports for wired connectors. Additionally, or in the alternative, communication interface logic 310 may be implemented with one or more radio units for supporting wireless communications with other network devices.

The one or more processors 300 are further coupled to the persistent storage 315 via the transmission medium 325. According to one embodiment of the disclosure, the persistent storage 315 may include (i) the static analysis engine 120 including the heuristics logic 121 and the signature matching logic 122; (ii) the virtual run-time environment 131 including the $VM_1$-$VM_K$ and the virtual machine manager (VMM) 132; (iii) the classification engine 140; and (iv) the reporting engine 150. Of course, when implemented as hardware (such as circuitry and/or programmable logic arrays), one or more of these logic units could be implemented separately from each other. In addition, one or more of these logic units may be implemented in hardware while one or more logic units may be implemented as software.

III. OPERATIONAL FLOW OF THE THREAT DETECTION PLATFORM

Figure 4:
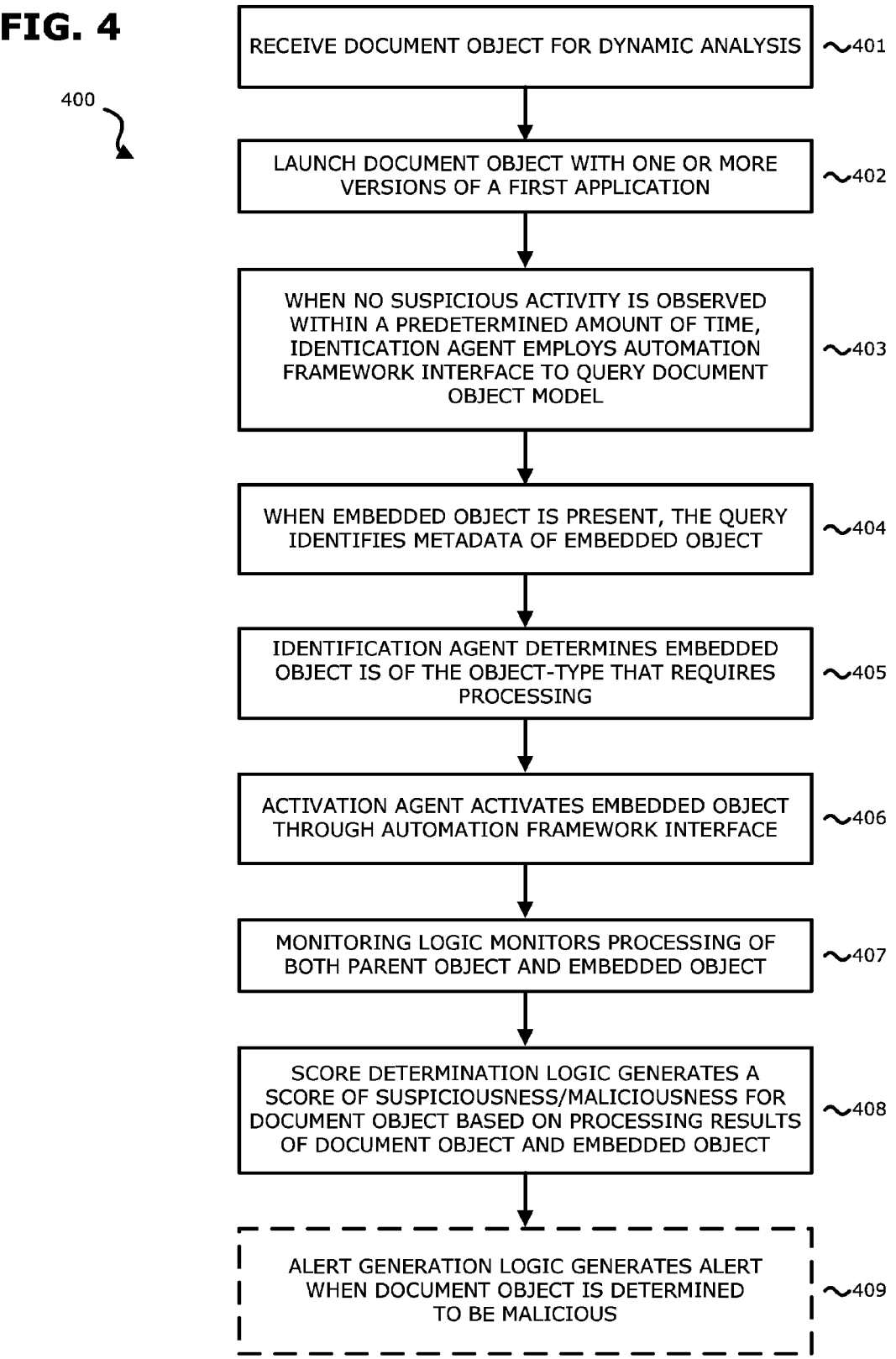
FIG. 4 is a flowchart illustrating an exemplary method for analyzing an object with the TDP $110_1$ of FIG. 1.

Referring to FIG. 4, a flowchart illustrating an exemplary method for analyzing a document object with the TDP $110_1$ of FIG. 1 is shown. Each block illustrated in FIG. 4 represents an operation performed in the method 400 of detecting malware based on the use of TDP $110_1$ of FIG. 1 wherein a document object under analysis includes an embedded object. At block 401, the TDP $110_1$ receives a document object to analyze and provides the document object to the $VM_1$. At block 402, the document object is launched in the $VM_1$ with one or more versions of a first application. For example, when the document object is a PDF document, multiple versions of Adobe® Reader® may be used to launch and process the document object. In such an example, the document object may be launched using Reader® 9.5, Reader® 10.0, Reader® 10.1 and Reader® 11.0.

At block 403, the document object is processed in each of the one or more versions of the first application for a predetermined amount of time to determine whether suspicious activity is observed. For example, an observation of suspicious activity may include, but is not limited or restricted to, detection of the detonation of an exploit, detection of a software vulnerability, activation of a macro and/or observation of anomalous behavior as a result of processing the document object 202. When no suspicious activity is observed within the predetermined amount of time, the identification agent 212 of the Dynamic Content Analyzer 210 (1) selects one of the versions of the application processing the document object 202 and (2) employs an automation framework interface to query the document object model (DOM) of the object-type of the document object 202 to determine whether the document object 202 includes an embedded object 203. The DOM of an object-type is a standardized structure to which the structure of an object of the object-type adheres.

In one embodiment, the Document Content Analyzer 210 may determine which version of the application processing the document object 202 to select based on information set forth in the configuration file 230. In a second embodiment, the Dynamic Content Analyzer 210 may include logic to select based on the versions processing the document object 202. The Dynamic Content Analyzer 210 may select the version processing the document object 202 most likely to include one or more vulnerabilities or the most prevalently used version by one or more corporate entities. In one embodiment, the oldest version of the application processing the document object 202 may be the most likely to include one or more vulnerabilities. In a second embodiment, the version including the least up-to-date software patch may be the most likely to include one or more vulnerabilities. Alternatively, the Dynamic Content Analyzer 210 may make the selection based on information included in the configuration file 230.

In one embodiment, the automation framework interface may be one or more software functions and/or a shared library (e.g., a dynamically linked library (DLL)) corresponding to the application processing the document object 202. The Dynamic Content Analyzer 210 may determine whether the document object 202 includes an embedded object 203 by employing the automation framework interface to query the document object model wherein the components of the document object 202 (e.g., nodes) are set forth in a predefined structure (e.g., in a tree structure such as a DOM tree) according to the object-type of the document object 202. In particular, the automation framework interface is loaded into the $VM_1$ as part of the configuration of the $VM_1$ with the application processing the document object 202. By employing the automation framework interface to query the DOM of the document object 202, the Dynamic Content Analyzer 210 is provided with query results that include a list of all embedded objects $203_1$-$203_N$ that are present in the document object 202 as well as pointers to each embedded object. The pointers to each of the embedded objects $203_1$-$203_N$ may be maintained in a table, which may be stored by the Dynamic Content Analyzer 210 in the storage 133. As discussed above, the query results also provide the Dynamic Content Analyzer 210 with metadata of each of the embedded objects $203_1$-$203_N$.

At block 404, the identification agent 212 receives query results detailing metadata of the embedded object 203 including an object-type of the embedded object 203 and the location of the embedded object 203 within the document object 202. In one embodiment, the Dynamic Content Analyzer 210 may direct focus of the processing of the document object 202 to a portion of the document object 202 that includes the embedded object 203. For example, when an embedded object is detected on page 50 of a Microsoft® Word document, the Dynamic Content Analyzer 210 may analyze page 50 of the Word document as the activation agent 213 launches the embedded object.

At block 405, based on the query results, the identification agent 212 determines whether the embedded object 203 is of the object-type that should be processed within the $VM_1$. In one embodiment, whether the embedded object is of the object-type that should be processed with the $VM_1$ may be derived based on a predetermined set of object-types set forth in the configuration file 230. At block 406, when the embedded object 203 is of the object-type that should be processed, the activation agent 213 launches the embedded object 203 in a second application by employing the automation framework interface of the first application. The second application used to launch and process the embedded object 203 is dependent on the object-type of the embedded object 203. Therefore, in one embodiment, the application-type of second application used to launch and process the embedded object 203 may be the same application-type as the first application used to launch and process the document object 202 (e.g., the document object 202 and the embedded object 203 are of the same object-type). In a second embodiment, the application-type of the second application may be the different than the application-type of the first application (e.g., the document object 202 and the embedded object 203 are of different object-types).

In an illustrative example, the document object 202 may be a Microsoft® Word document (e.g., a document of a text processor) that includes a PDF document as an embedded object 203. Initially, the Dynamic Content Analyzer 210 (or specifically, the launcher 211) may launch the Word document (the document object 202) in one or more versions of Microsoft® Word. Microsoft® Word provides access to the automation framework interface, "Automation," based on a documented format (e.g., based on the object-type of the document object 202). Automation may be used to determine the presence of the embedded object 203 (the PDF document) based on query results received from the document object model of Word. Automation may then utilize a packager tool to launch the embedded object 203. The packager tool is provided as part of the installation package of Microsoft® Office applications by default and performs, inter alia, (1) operations to embed an object and (2) operations to launch an embedded object. Therein, the packager tool may launch the embedded object 203 in a version of Adobe® Reader based on information included in the object package containing the embedded object. An object package is created by the packager tool in order to embed an object.

In this example, the packager tool within Word would have created an object package in order to embed the PDF document within the Word document.

The packager tool may launch the embedded object 203 while maintaining the context of the embedding in the document object 202. The context of the embedding in the document object 202 may include, but is not limited or restricted to, activation from the application in which the embedded object 203 is embedded, any links between the embedded object 203 and the application in which the embedded object 203 is embedded, the name of the embedded object 203 and/or version information of the application used to launch the embedded object 203. Launching the embedded object 203 without maintaining the context of the embedding in the document object 202 may alter the embedded object 203 by, for example, modifying the name of the embedded object 203 and/or altering any links between the embedded object 203 and the application in which the embedded object 203 is embedded (e.g., malware may require the embedded object 203 to launch from a certain application and/or version in order to detonate). An alteration may in turn signal to malware not to detonate and thus allow the malware to go undetected.

At block 407, the monitoring logic 220 monitors the processing of both the document object 202 and the embedded object 203. Additionally, the monitoring logic 220 may store processing details in the storage device 133, via the VMM 132. For example, the monitoring logic 220 may record, inter alia, any actions performed by the document object 202 and/or the embedded object 203 (e.g., copying data, attempts to access storage locations, attempts to establish an external server, etc.), any requests for human interaction made during the processing of the document object 202 and/or the embedded object 203, and/or any results of simulated human interaction. Additionally, the monitoring logic 220 may store time stamps for all records made and PIDs of each application.

At block 408, the results of the processing of the document object 202 and the embedded object 203 may be provided to the score determination logic 142 of the classification engine 140. The score determination logic 142 may generate a score of suspiciousness and/or maliciousness for the document object 202 based on the processing results of the document object 202 and/or the embedded object 203.

At block 409, optionally, an alert may be generated by the alert generation logic 151 when an object is determined to be malicious and/or suspicious. The alert may notify one or more of a user of an endpoint device, a network administrator and/or an expert network analyst of the malware included in the object and, if applicable, the family of malware to which the detected malware belongs.

Additionally, the identification agent 212 may detect one or more embedded objects in the document object 202. Each of the embedded objects may be of the same object-type or one or more of the embedded objects may be of a different object-type. For example, a document object may include a PDF document and a Microsoft® Word document as embedded objects. When a plurality of embedded objects are detected, the embedded objects are activated selectively by the activation agent 213. In one embodiment, the activation agent 213 may determine an order of activating the plurality of embedded objects. The determination may be made based on, for example, the object-type of each embedded object wherein the ordering of the object-types is set-forth in the configuration file 230. In a second embodiment, the activation agent 213 may activate all of the detected embedded objects simultaneously.

Furthermore, an embedded object may include one or more embedded objects. Therefore, when an embedded object is launched for processing, the Dynamic Content Analyzer 210 may detect one or more secondary embedded objects. The Dynamic Content Analyzer 210 may determine whether to launch one or more of the secondary embedded objects (or any objects detected while processing a secondary embedded object) based on the configuration file 230. The configuration file 230, as discussed above, may be stored in, for example the storage device 133 or the storage device 113. In addition, the configuration file 230 may be updated by, for example, information received from the management system 107 and/or from the cloud computing services 105. Additionally, the configuration file 230 may set forth a predetermined amount of processing time the Dynamic Content Analyzer 210 should wait while detecting suspicious activity prior to selecting a version of the application processing the document object 202 for analysis for embedded objects (as discussed below).

A. Detection Phase

Figure 5:
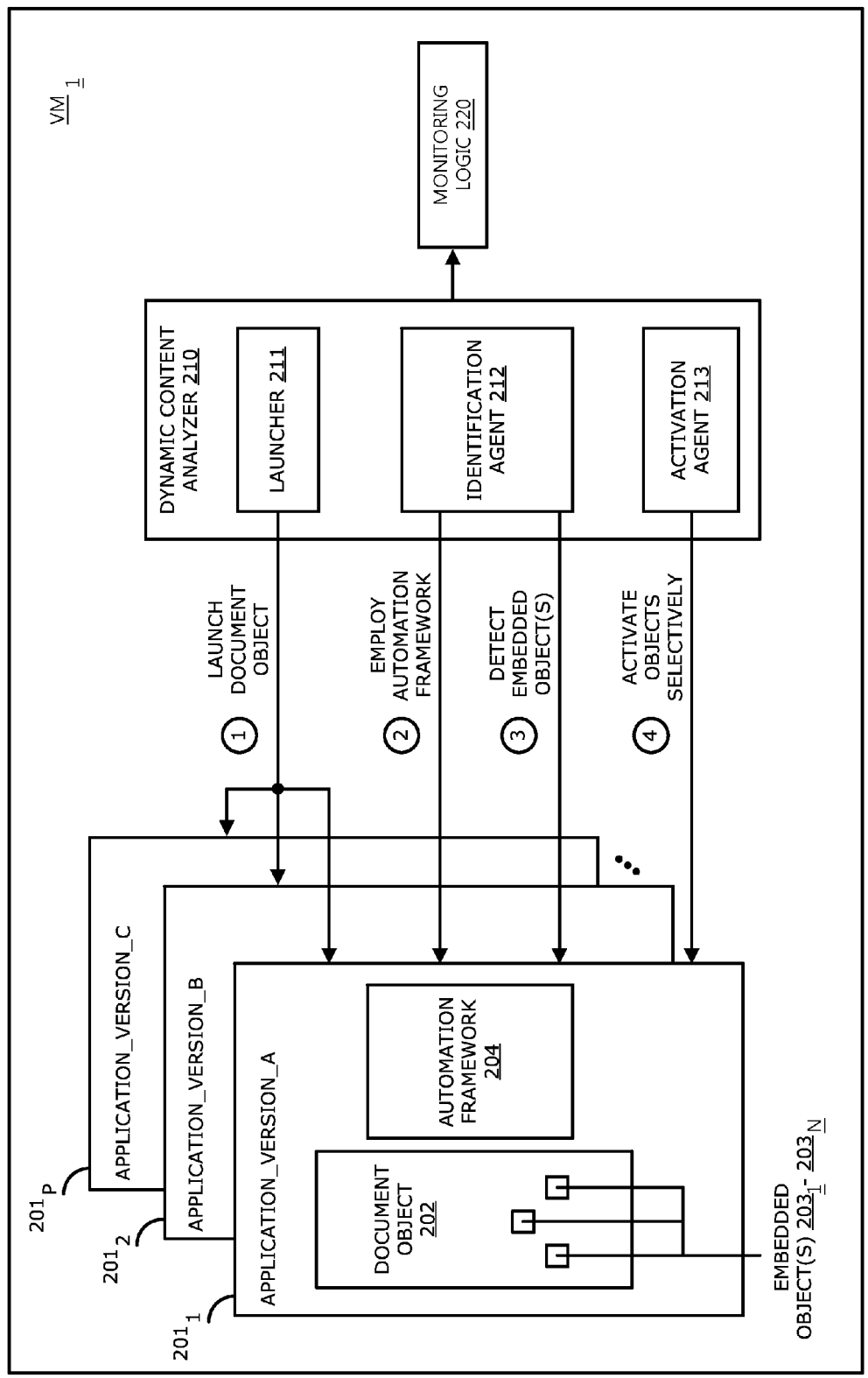
FIG. 5 is an illustration of a first exemplary illustrative flow for detecting an embedded object with the TDP $110_1$ of FIG. 1.

Referring now to FIG. 5, an illustration of a first exemplary illustrative flow for detecting an embedded object with the TDP $110_1$ of FIG. 1 is shown. Herein, a document object 202 has been provided to the $VM_1$ for dynamic analysis. The launcher 211 of the Dynamic Content Analyzer 210 launches the document object 202 in one or more instances of a first application $201_1$-$201p$ (wherein P≥1).

After a predetermined amount of time has passed and no suspicious activity has been observed, the Dynamic Content Analyzer 210 selects one application instance (e.g., one version of the application) to check for embedded objects therein. As discussed above, in one embodiment, the version of the application may be selected based on reference to the configuration file 230 that may be stored in, for example, the storage device 133 or the storage device 113. In a second embodiment, e.g., in the absence of a predetermined version set forth in a configuration file, the Dynamic Content Analyzer 210 may select a version of the application, as discussed above.

The identification agent 212 employs an automation framework interface to query the document object model of the document object 202. The query returns whether the document object 202 includes one or more embedded objects $203_1$-$203_N$ and metadata of each of the one or more embedded objects $203_1$-$203_N$. The metadata may include the application processing the document object 202, the object-type of the embedded object $203_1$-$203_N$, the name of the embedded object $203_1$-$203_N$, the location of the embedded object $203_1$-$203_N$, and/or one or more attributes of the embedded object $203_1$-$203_N$ (e.g., enable, visible, play, loop, width, height). Additionally, the metadata may be stored in, for example, an event log in the storage device 133 and/or the storage device 113.

The identification agent 212 of the Dynamic Content Analyzer 210 determines whether one or more of the embedded objects $203_1$-$203_N$ are of the object-type that should be further processed based on a predefined list of object-types set-forth in the configuration file 230. When an embedded object $203_N$ is not of an object-type that is to be further processed, the presence of the embedded object $203_N$ is stored by the monitoring logic 220 in, for example, the storage device 133 for use in the determination as to whether the document object 202 is malicious.

When one or more embedded objects $203_1$-$203_N$ are detected within the document object 202 and are of the object-type that should be further processed, the activation agent 213 launches one or more of the embedded object $203_1$-$203_N$ that are of the object-type to be processed further.

In one embodiment, the embedded objects $203_1$-$203_N$ may be launched concurrently (wherein, the term "concurrently" should be interrupted as "at least partially overlapping at the same time"). In a second embodiment, the embedded objects $203_1$-$203_N$ may be launched in a serial manner. Each of the $VM_1$-$VM_K$ is configured with the applications needed to process embedded objects of the object-types included in the predefined list of object-types that should be further processed.

Figure 6:
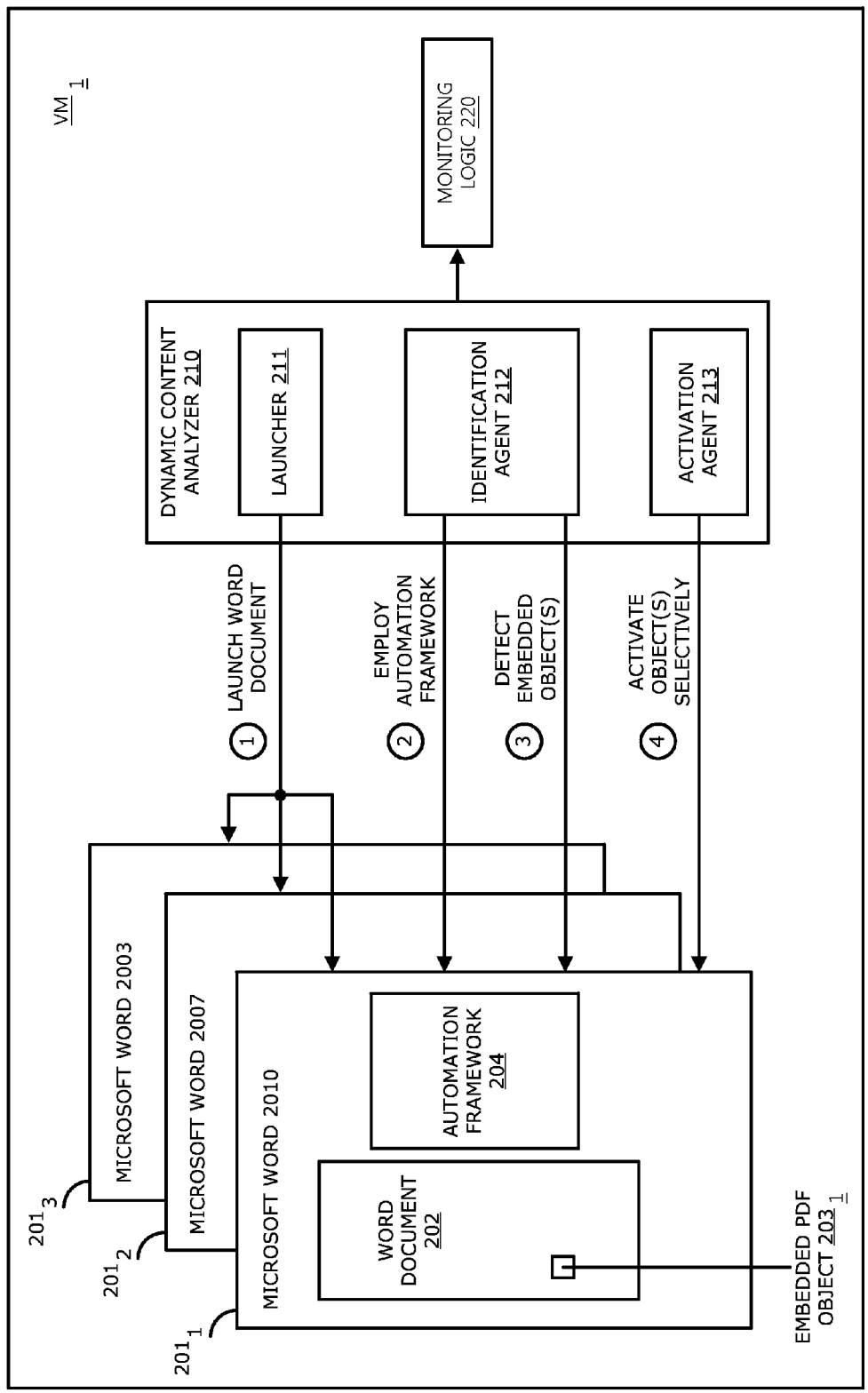
FIG. 6 is an illustration of a second exemplary illustrative flow for detecting an embedded object with the TDP $110_1$ of FIG. 1.

Referring to FIG. 6, an illustration of a second exemplary illustrative flow for detecting an embedded object with the TDP $110_1$ of FIG. 1 is shown. FIG. 6 illustrates a detailed embodiment of the exemplary illustrative flow of FIG. 5. Herein, a document object 202 (e.g., a Microsoft® Word document) has been provided to the $VM_1$ for dynamic analysis. The launcher 211 of the Dynamic Content Analyzer 210 launches the Word document 202 in a plurality of instances of Microsoft® Word $201_1$-$201_P$ (wherein P=3 for this example). In the embodiment shown, the launcher 211 launched the Word document 202 in a plurality of versions including Microsoft® Word 2003, Microsoft® Word 2007 and Microsoft® Word 2010. Additionally, as illustrated, each version of Microsoft® Word is seen to include an automation framework interface. For example, when the document object 202 is a Word document, the document object 202 may be launched and processed with Microsoft® Word running in a Windows operating system. Windows operating systems provide an automation framework interface referred to as "Automation" (or "OLE Automation"), which is able to access the document object model through Component Object Model (COM) interfaces.

After a predetermined amount of time has passed and suspicious activity has not been observed, the identification agent 212 of the Dynamic Content Analyzer 210 selects one application instance (e.g., one version of the application) to check for embedded objects therein. In one embodiment, the version of the application may be selected based on reference to the configuration file 230. In a second embodiment, e.g., in the absence of a predetermined version set forth in the configuration file 230, the Dynamic Content Analyzer 210 may select a version of the application (e.g., Word 2003).

The identification agent 212 of the Dynamic Content Analyzer 210 employs an automation framework interface to query the document object model of the document object 202. The query returns whether the document object 202 includes one or more embedded objects $203_1$-$203_N$ and metadata of each of the one or more embedded objects $203_1$-$203_N$ including the object-type of each of the one or more embedded objects $203_1$-$203_N$ and the location of each of the one or more embedded objects $203_1$-$203_N$.

When the embedded PDF object $203_1$ is detected within the Word document 202, the identification agent 212 determines whether the object-type of the embedded PDF object $203_1$ (PDF) is of the type that should be further processed. In one embodiment, the determination of whether an embedded object is of the object-type that should be further processed may be made based on reference to the configuration file 230. For example, the configuration file 230 may include a predefined set of object-types that should be further processed.

When the embedded PDF object $203_1$ is not of the type that should be further processed, the TDP $110_1$ includes the presence of the embedded object 203 in the determination of whether the document object 202 is malicious. In the case that the object-type is not recognized by the Dynamic Content Analyzer 210, a notification may be generated by the alert generation 151 and provided to a network administrator and/or an expert network analyst.

Upon determining the embedded PDF object $203_1$ is of the type that should be further processed, the activation agent 213 launches the embedded object $203_1$. The activation agent 213 launches the embedded object $203_1$ within the $VM_1$, while maintaining a context of the embedding of the embedded PDF object $203_1$ within the Word document by utilizing a packager tool, as discussed above.

Once the embedded PDF object $203_1$ has been launched, the monitoring logic 220 monitors both the Word document processing in the selected version of Microsoft® Word as well as the embedded PDF object $203_1$ processing in Adobe® Reader. As discussed above, processing information may be stored by the monitoring logic 220 in an event log included in the storage device 133 and/or the storage device 113 and provided, or made available, to the score determination logic 142 in the classification engine 140. Herein, the processing information of the embedded PDF object $203_1$ that is monitored and stored by the monitoring logic 220 may be used in the determination of a threat level (e.g., "suspicious," "malicious," or "benign") or a score representing the maliciousness of the Word document 202. By processing the embedded PDF object $203_1$ instead of merely using the presence of an embedded object included in the Word document 202 as factor in determining the maliciousness of the Word document 202, the TDP $110_1$ may obtain a more complete understanding of the maliciousness of the Word document 202. Therefore, by processing the embedded PDF object $203_1$ and detecting malware therein, the TDP $110_1$ may determine the Word document 202 is malicious, although the analysis of the processing of the Word document 202 within one or more of the instances of Microsoft® Word $201_1$-$201_3$ did not detect malware.

B. Activation Phase

Figure 7:
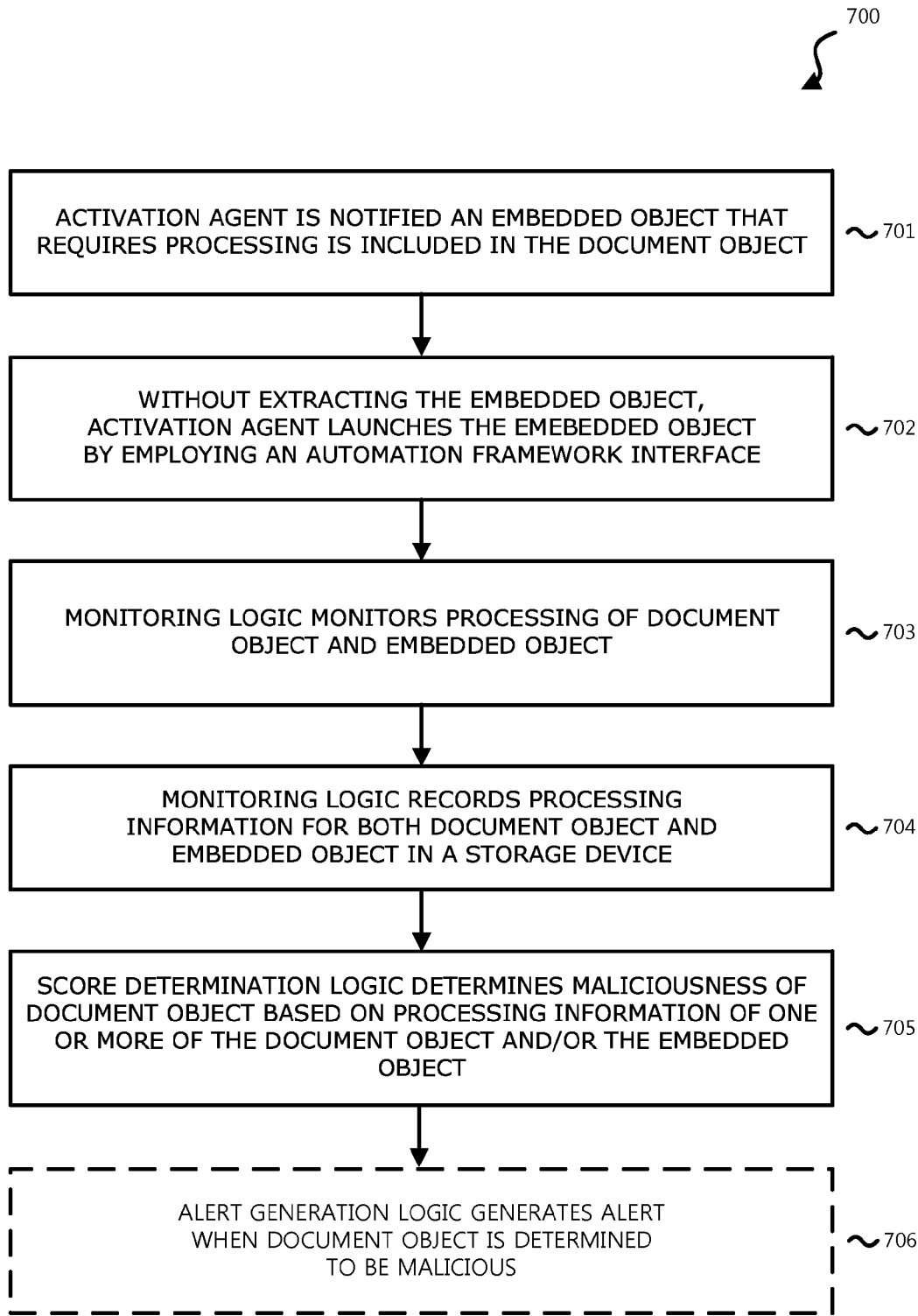
FIG. 7 is a flowchart illustrating an exemplary method for launching a detected embedded object with the TDP $110_1$ of FIG. 1.

Referring to FIG. 7, a flowchart illustrating an exemplary method for launching a detected embedded object with the TDP $110_1$ of FIG. 1 is shown. Each block illustrated in FIG. 7 represents an operation performed in the method 700 of launching a detected embedded object 203 within a document object 202 based on the use of TDP $110_1$ of FIG. 1 wherein a document object 202 under analysis includes an embedded object 203. At block 701, the activation agent 213 of the Dynamic Content Analyzer 210 is notified by the identification agent 213 that an embedded object 203 that requires processing is included in the document object 202. As discussed above, the identification agent 213 employs an automation framework interface to query the document object model.

At block 702, the activation agent 213 launches the embedded object 203 by employing the automation framework interface. Specifically, the embedded object 203 is launched while maintaining the context of the embedding of the embedded object 203 within the document object 202.

At block 703, the monitoring logic 220 monitors the processing of the document object 202 and the embedded object 203. At block 704, the monitoring logic 220 may store processing information according to each of the document object 202 and the embedded object 203 by association with the PIDs of each of the applications performing processing. The processing information may be stored in, for example, the storage device 133.

At block 705, the score determination logic 142 of the classification engine may be provided with the processing information. The score determination 142 may determine the maliciousness of the document object 202 based on the processing information of the document object 202 and/or the processing information of the embedded object 203, in addition to a static analysis result provided by the static analysis engine 120, if applicable. Additionally, the classification engine 140 may determine a malware family to which detected malware belongs.

Finally, at block 706, optionally, an alert may be generated by the alert generation logic 151 when an object is determined to be malicious and/or suspicious. The alert may notify one or more of a user of an endpoint device, a network administrator and/or an expert network analyst of the malware included in the object and, if applicable, the family of malware to which the detected malware belongs.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory computer readable storage medium having stored thereon logic that, upon execution by one or more processors implemented within a network device, performs operations during processing of a first object in a virtual machine, comprising:
   launching the first object in the virtual machine;
   querying a document object model corresponding to an object-type of the first object to determine whether an embedded object is included in the first object;
   responsive to querying the document object model, receiving metadata associated with the embedded object, the metadata including an object-type of the embedded object;
   responsive to determining the object-type of the embedded object is one of a predetermined set of object-types based on the metadata, processing the embedded object in the virtual machine; and
   determining whether at least one of the first object or the embedded object is malicious.

2. The non-transitory computer readable storage medium of claim 1, wherein the processing of the embedded object includes launching the embedded object to place the embedded object in an activated state and subsequently processing the activated embedded object.

3. The non-transitory computer readable storage medium of claim 1 wherein the logic, upon execution by the one or more processors implemented within the network device, further performs operations comprising:
   prior to processing the first object in the virtual machine, launching the first object in a plurality of versions of a first application.

4. The non-transitory computer readable storage medium of claim 3 wherein the logic, upon execution by the one or more processors implemented within the network device, further performs operations comprising:
   monitoring the processing of the first object for suspicious activity; and
   when no suspicious activity has been observed within a predetermined amount of time and prior to querying the document object model, selecting a version of the plurality of versions of the first application to utilize when querying the document object model.

5. The non-transitory computer readable storage medium of claim 1, wherein the launching of the embedded object is performed through an automation framework interface.

6. The non-transitory computer readable storage medium of claim 5, wherein when the first object is a document of a text processor, the automation framework interface uses a packager tool to launch the embedded object.

7. The non-transitory computer readable storage medium of claim 1, wherein based on the processing of the first object and the processing of the embedded object, a threat level is determined.

8. The non-transitory computer readable storage medium of claim 1, wherein, during the processing of the embedded object, a secondary embedded object is detected within the embedded object.

9. The non-transitory computer readable storage medium of claim 8, wherein, whether processing of the secondary embedded object is performed is determined based on information in a configuration file.

10. The non-transitory computer readable storage medium of claim 9, wherein the configuration file may be updated based on information received over a network.

11. The non-transitory computer readable storage medium of claim 1 wherein the logic, upon execution by the one or more processors implemented within the network device, further performs operations comprising:
    storing metadata of the embedded object in an event log.

12. The non-transitory computer readable storage medium of claim 11, wherein the metadata is used to generate one or more signatures.

13. A system for detecting malware during processing of a first object in a virtual machine, the system comprising:
    one or more processors; and
    a storage module communicatively coupled to the one or more processors, the storage module comprising logic executed by the one or more processors, the logic comprising:
      a launcher that launches the first object in a plurality of versions of the first application processed in the virtual machine;
      an identification agent that utilizes an automation framework interface to query a document object model corresponding to the object-type of the first object to determine whether an embedded object is included with the first object and to receive metadata of the embedded object based on the query to the document object model, the metadata including an object-type of the embedded object, the identification agent further selects one version of the plurality of versions of the first application to utilize when (i) querying the document object model and (ii) no suspicious activity is observed within a predetermined amount of time; and
      an activation agent for launching the embedded object in a second application in the virtual machine.

14. The system of claim 13, wherein the activation agent, when launching the embedded object, places the embedded object in an activated state and processes the activated embedded object.

15. The system of claim 13, wherein the identification agent determines the object-type of the embedded object is one of a predetermined set of object-types.

16. The system of claim 13, wherein the activation agent launches the embedded object by utilizing the automation framework interface of the first application.

17. The system of claim 16, wherein when the first object is a document of a text processor, the automation framework interface uses a packager tool to launch the embedded object.

18. The system of claim 13, wherein the first application is dependent on the object-type of the first object and the second application is dependent on the object-type of the embedded object.

19. A computerized method detecting malware associated with a first object being processed in a virtual machine, the method comprising:
   launching the first object in the virtual machine;
   querying a document object model corresponding to an object-type of the first object to determine whether an embedded object is included in the first object;
   receiving metadata associated with the embedded object based on the querying of the document object model, the metadata including an object-type of the embedded object;
   responsive to determining the object-type of the embedded object is one of a predetermined set of object-types based on the metadata, processing the embedded object in the virtual machine; and
   determining whether at least one of the first object or the embedded object is malicious.

20. The computerized method of claim 19, wherein the processing of the embedded object includes launching the embedded object to place the embedded object in an activated state and subsequently processing the activated embedded object.

21. The computerized method of claim 19 further comprising:
   prior to processing the first object in the virtual machine, launching the first object in a plurality of versions of a first application.

22. The computerized method of claim 21, wherein when no suspicious activity is observed within a predetermined amount of time, selecting one version of the plurality of versions of the first application to utilize when querying the document object model.

23. The computerized method of claim 21, wherein the launching of the embedded object is performed by utilization of an automation framework interface.

24. The computerized method of claim 23, wherein when the first object is a document of a text processor, the automation framework interface uses a packager tool to launch the embedded object.

25. The computerized method of claim 19, wherein based on the processing of the first object and the processing of the embedded object, a threat level is determined.

26. The computerized method of claim 19, wherein, during the processing of the embedded object, a secondary embedded object is detected within the embedded object.

27. The computerized method of claim 26, wherein, whether processing of the secondary embedded object is performed is determined based on information in a configuration file.

28. The computerized method of claim 27, wherein the configuration file may be updated based on information received over a network.

29. The computerized method of claim 19, further comprising:
   storing metadata of the embedded object in an event log.

30. The computerized method of claim 29, wherein the metadata is used to generate one or more signatures.

31. The non-transitory computer readable storage medium of claim 1, wherein the metadata further includes an object-type of the embedded object, and the logic, upon execution by the one or more processors implemented within the network device, further performs operations comprising:
   responsive to determining the location of the embedded object based on the metadata, directing the processing of the first object to a portion of first object including the location of the embedded object, the portion of the first object being less than an entirety of the first object.

32. The non-transitory computer readable storage medium of claim 1, wherein the embedded object is a Uniform Resource Locator (URL).

33. The non-transitory computer readable storage medium of claim 2, wherein the activating and the processing of the embedded object includes maintaining a context of embedding the embedded object in the first object.

34. A non-transitory computer readable storage medium having stored thereon logic that, upon execution by one or more processors implemented within a network device, performs operations during processing a first object in a virtual machine, comprising:
   launching the first object in the virtual machine;
   querying a document object model corresponding to an object-type of the first object to determine whether an embedded object is included in the first object;
   responsive to querying the document object model, receiving metadata associated with the embedded object, the metadata including a location of the embedded object within the first object;
   responsive to determining the location of the embedded object based on the metadata, directing processing of the first object to a portion of the first object including the location of the embedded object, the portion of the first object being less than an entirety of the first object;
   processing the embedded object; and
   determining whether at least one of the first object or the embedded object is malicious.

35. The non-transitory computer readable storage medium of claim 34, wherein the processing of the embedded object includes launching the embedded object to place the embedded object in an activated state and subsequently processing the activated embedded object.

36. The non-transitory computer readable storage medium of claim 34, wherein the embedded object is a Uniform Resource Locator (URL).

37. The non-transitory computer readable storage medium of claim 34 wherein the logic, upon execution by the one or more processors implemented within the network device, further performs operations comprising:
   launching the first object in a plurality of versions of a first application.

38. The non-transitory computer readable storage medium of claim 37 wherein the logic, upon execution by the one or more processors implemented within the network device, further performs operations comprising:
   monitoring the processing of the first object for suspicious activity; and
   when no suspicious activity has been observed within a predetermined amount of time and prior to querying the document object model, selecting a version of the plurality of versions of the first application to utilize when querying the document object model.

39. The non-transitory computer readable storage medium of claim 34, wherein the launching of the embedded object is performed through an automation framework interface.

40. The non-transitory computer readable storage medium of claim 39, wherein when the first object is a document of a text processor, the automation framework interface uses a packager tool to launch the embedded object.

41. The non-transitory computer readable storage medium of claim 34, wherein based on the processing of the first object and the processing of the embedded object, a threat level is determined.

42. The non-transitory computer readable storage medium of claim 34, wherein, during the processing of the embedded object, a secondary embedded object is detected within the embedded object.

43. The non-transitory computer readable storage medium of claim 42, wherein, whether processing of the secondary embedded object is performed is determined based on information in a configuration file.

44. The non-transitory computer readable storage medium of claim 43, wherein the configuration file may be updated based on information received over a network.

45. The non-transitory computer readable storage medium of claim 34 wherein the logic, upon execution by the one or more processors implemented within the network device, further performs operations comprising:
storing metadata of the embedded object in an event log.

46. The non-transitory computer readable storage medium of claim 45, wherein the metadata is used to generate one or more signatures.

47. A system for detecting malware during processing of a first object in a virtual machine, the system comprising:
one or more processors; and
a storage module communicatively coupled to the one or more processors, the storage module comprising logic executed by the one or more processors, the logic comprising:
a launcher that launches the first object in a plurality of versions of the first application processed in the virtual machine;
an identification agent that utilizes an automation framework interface to query a document object model corresponding to the object-type of the first object to determine whether an embedded object is included with the first object and to receive metadata of the embedded object based on the query to the document object model, the metadata including a location of the embedded object in the first object, the identification agent further selects one version of the plurality of versions of the first application to utilize when (i) querying the document object model and (ii) no suspicious activity is observed within a predetermined amount of time; and
an activation agent for launching the embedded object in a second application in the virtual machine.

48. The system of claim 47, wherein the activation agent, when launching the embedded object, places the embedded object in an activated state for processing within the virtual machine.

49. The system of claim 47, wherein the embedded object is a Uniform Resource Locator (URL).

50. The system of claim 47, wherein the processing of the embedded object includes launching the embedded object to place the embedded object in an activated state and subsequently processing the activated embedded object.

51. The system of claim 47 wherein the logic, upon execution by the one or more processors implemented within the network device, further performs operations comprising:
launching the first object in a plurality of versions of a first application.

52. The system of claim 51 wherein the logic, upon execution by the one or more processors implemented within the network device, further performs operations comprising:
monitoring the processing of the first object for suspicious activity; and
when no suspicious activity has been observed within a predetermined amount of time and prior to querying the document object model, selecting a version of the plurality of versions of the first application to utilize when querying the document object model.

53. The system of claim 47, wherein the launching of the embedded object is performed through an automation framework interface.

54. The system of claim 53, wherein when the first object is a document of a text processor, the automation framework interface uses a packager tool to launch the embedded object.

55. The system of claim 47, wherein based on the processing of the first object and the processing of the embedded object, a threat level is determined.

56. The system of claim 47, wherein, during the processing of the embedded object, a secondary embedded object is detected within the embedded object.

57. The system of claim 56, wherein, whether processing of the secondary embedded object is performed is determined based on information in a configuration file.

58. The system of claim 57, wherein the configuration file may be updated based on information received over a network.

59. The system of claim 47 wherein the logic, upon execution by the one or more processors implemented within the network device, further performs operations comprising:
storing metadata of the embedded object in an event log.

60. The system of claim 59, wherein the metadata is used to generate one or more signatures.

61. A computerized method detecting malware associated with a first object being processed in a virtual machine, the method comprising:
launching the first object in the virtual machine;
querying a document object model corresponding to an object-type of the first object to determine whether an embedded object is included in the first object;
responsive to querying the document object model, receiving metadata associated with the embedded object, the metadata including a location of the embedded object;
responsive to determining the location of the embedded object based on the metadata, directing processing of the first object to a portion of the first object including the location of the embedded object, the portion of the first object being less than an entirety of the first object;
processing the embedded object; and
determining whether at least one of the first object or the embedded object is malicious.

62. The computerized method of claim 61, wherein the processing of the embedded object includes launching the embedded object to place the embedded object in an activated state and subsequently processing the activated embedded object.

63. The computerized method of claim 61, wherein the embedded object is a Uniform Resource Locator (URL).

64. The computerized method of claim 61, wherein logic, upon execution by the one or more processors implemented within the network device, further performs operations comprising:

prior to processing the first object in the virtual machine, launching the first object in a plurality of versions of a first application.

65. The computerized method of claim 64, wherein the logic, upon execution by the one or more processors implemented within the network device, further performs operations comprising:
monitoring the processing of the first object for suspicious activity; and
when no suspicious activity has been observed within a predetermined amount of time and prior to querying the document object model, selecting a version of the plurality of versions of the first application to utilize when querying the document object model.

66. The computerized method of claim 61, wherein the launching of the embedded object is performed through an automation framework interface.

67. The computerized method of claim 66, wherein when the first object is a document of a text processor, the automation framework interface uses a packager tool to launch the embedded object.

68. The computerized method of claim 61, wherein based on the processing of the first object and the processing of the embedded object, a threat level is determined.

69. The computerized method of claim 61, wherein, during the processing of the embedded object, a secondary embedded object is detected within the embedded object.

70. The computerized method of claim 69, wherein, whether processing of the secondary embedded object is performed is determined based on information in a configuration file.

71. The computerized method of claim 70, wherein the configuration file may be updated based on information received over a network.

72. The computerized method of claim 61 wherein the logic, upon execution by the one or more processors implemented within the network device, further performs operations comprising:
storing metadata of the embedded object in an event log.

73. The computerized method of claim 72, wherein the metadata is used to generate one or more signatures.

* * * * *